United States Patent Office

2,992,883
Patented July 18, 1961

2,992,883
METHOD OF TEMPORARILY STERILIZING A LIQUID
Franz Meinrad Kuen, Salesianergasse 3A, Vienna III, Austria
No Drawing. Filed Oct. 24, 1958, Ser. No. 769,307
Claims priority, application Austria Nov. 7, 1957
11 Claims. (Cl. 21—58)

My present invention relates to a method of suppressing the development of micro-organisms in perishable materials of synthetic, animal or vegetable origin, more particularly in solutions, suspensions and immersions containing organic matter adapted to be decomposed by the action of such organisms.

In my prior U.S. Patent No. 2,842,441, issued July 8, 1958, I have disclosed a process for the temporary sterilization of alcoholic beverages and other liquids by the admixture therewith of an alkyl phenyl ester of a halogenated fatty acid, preferably one whose alkyl phenyl radical has an aliphatic side chain of not more than two carbon atoms. This preservative not only inhibits the growth of micro-organisms in the liquid, even when present in minute quantities of the order of 0.002 to 0.01 milligram per gram of liquid, but also decays after a while into inert decomposition products which are biologically indifferent and therefore harmless to the consumer.

In the case of certain liquids such as bottled beverages, in which there is practically no risk of recontamination prior to consumption, it is generally desirable that the decomposition of the preservative proceed in as short a time as possible. The rate of decay is, however, influenced by a variety of factors including the nature of the treated liquid, its pH and its temperature, the concentration of the preservative, and the presence of other additives. This rate is also affected by the number of micro-organisms in the liquid.

An object of my present invention is to provide a method of controlling, i.e. accelerating to a desired extent, the rate of decomposition of an unstable preservative in a liquid which is to be temporarily sterilized thereby.

A more specific object of this invention is to provide a method of thus controlling the decay of a preservative as disclosed in my above-identified prior patent.

A further object of the invention is to provide a method of positively insuring the decay of such preservative into harmless components within a predetermined period, thereby obviating the need for analytically determining the absence of toxic compounds as might otherwise be required in doubtful cases.

The effectiveness of a preservative against fungi and/or bacteria results from its ability to react with the albumin groups of either the living cells or the enzymes necessary for their metabolism. This has led me to investigate the possibility of using albuminous additives to accelerate the decomposition of the preservative after its cidal or static effect is no longer desired. The admixture of gelatin or the like with organic halogen compounds does in fact promote their conversion into inorganic halogen salts, yet the rate of reaction is so slow that such procedure is of little practical value. I have found, however, that this rate of reaction can be markedly speeded up by the use of not the high-molecular-weight albumins themselves but their degeneration or degradation products such as the hydrolyzates and the constituent amino acids thereof.

While the degeneration products referred to above may be added to the liquid to be sterilized at any time prior to, simultaneously with or after the admixture of the preservative, it is preferred to introduce the decay-promoting additive after an interval during which the preservative was allowed to exert its full force against the micro-organisms present in the liquid. In some cases, as in the treatment of mash, best results are achieved if the preservative is admixed with the liquid at elevated temperatures whereas the albuminous degeneration product is added after the mixture has cooled.

Generally, the degeneration products of interest in accordance with this invention includes the amino acids containing sulfhydryl groups, as well as the peptides, polypeptides and proteoses obtained from gelatin, keratin, yeast albumin and other albuminous substances by direct hydrolysis (e.g. with hydrochloric acid) or by fermental action. Among compounds which have proved themselves particularly effective there may be mentioned cysteine, glutathione and methionine.

In a liquid containing as a preservative a halogenated-fatty-acid derivative as disclosed in my prior patent, in the proportions given there, the additive will be effective if present in a quantity of as little as 0.01 milligram per gram of liquid. It should be understood, however, that the concentration of the additive may be varied over a wide range, depending upon the desired rate of decay, and that a practical lower limit is a proportion equaling that of the preservative whereas the upper limit is generally determined only by the cost factor and the possibility of an objectionable adulteration of certain properties (e.g. taste) of the treated liquid.

*Example 1*

Distillery mash is sterilized by treatment with 0.0005%, by weight, of the benzyl ester of brominated acetic acid as described in my above-identified patent. This preservative is added to the mash while the latter is still warm. After cooling, a quantity of 0.001% of methionine is added to the mash. This treatment eliminates the detrimental consequences of the usual mash infections and results in a sterile product which can immediately be brought to fermentation by further treatment with starting yeast.

*Example 2*

The same as Example 1, except that a corresponding quantity of a hydrolyzate of yeast albumin is used in lieu of the methionine.

*Example 3*

An extract of Hamamelis leaves is obtained by percolation with 4% aqueous alcohol. This extract is sterilized by admixture of 0.0002% of the ethyl phenyl ester of brominated acetic acid therewith. Subsequently, there is added to the mixture a quantity of 0.001% of glutathione which results in the rapid decay of the organic halogen compound into inert components.

*Example 4*

The same as Example 3, except that a corresponding quantity of cysteine is used instead of glutathione.

I claim:
1. The method of temporarily sterilizing a liquid containing perishable organic matter which comprises admixing with said liquid an unstable preservative comprising an alkyl phenyl ester of a halogenated fatty acid and, after a period sufficient to ensure substantially complete inhibition of microbial action in said liquid, accelerating the decay of said preservative by adding thereto an at least equal quantity of a degeneration product of albumin.
2. The method according to claim 1 wherein said degeneration product is an amino acid.
3. The method according to claim 2 wherein said amino acid contains a sulfhydryl group.
4. The method according to claim 1 wherein said degeneration product is a hydrolyzate of albumin more complex than its constituent amino acids.

5. The method according to claim 1 wherein said degeneration product is selected from the group which consists of methionine, cysteine and glutathione.

6. The method according to claim 1 wherein said preservative is present in a proportion of the order of 0.0002% to 0.001%, by weight, of said liquid, said degeneration product being present in a proportion of the order of 0.001%, by weight, of said liquid.

7. The method according to claim 1 wherein said preservative is admixed with the liquid at an elevated temperature, said degeneration product being added to the mixture after the latter has cooled.

8. The method according to claim 1 wherein the alkyl phenyl radical of said ester has an aliphatic side chain of not more than two carbon atoms.

9. The method of accelerating the decomposition of a preservative in a liquid to be packaged, said preservative being an alkyl phenyl ester of a halogenated fatty acid, which comprises the step of adding to said liquid, prior to packaging the latter and after a period sufficient to ensure complete inhibition of microbial action in said liquid, a quantity of a degeneration product of albumin at least equal to the quantity of said preservative in said liquid.

10. The method of temporarily sterilizing a liquid containing perishable organic matter which comprises admixing with said liquid an unstable preservative comprising an alkyl phenyl ester of a halogenated fatty acid and, after a period sufficient to ensure substantially complete inhibition of microbial action in said liquid, accelerating the decay of said preservative by adding thereto an at least equal quantity of a substance comprising at least one of the group which consists of methionine, cysteine and glutathione.

11. The method according to claim 10 wherein said preservative is present in a proportion of the order of 0.0002% to 0.001%, by weight, of said liquid, said substance being present in a proportion of the order of 0.001%, by weight, of said liquid.

References Cited in the file of this patent

UNITED STATES PATENTS

| 2,475,368 | Bauer | July 5, 1949 |
| 2,711,976 | Castellani | June 28, 1955 |
| 2,842,441 | Kuen | July 8, 1958 |

OTHER REFERENCES

Herstein et al.: Chemistry and Technology of Wines and Liquors, 2nd ed., Van Nostrand Co., Inc., N.Y., pp. 15–18, 1948.

Haurowitz: Chemistry and Biology of Proteins, Academic Press Inc., p. 32, publ., N.Y., 1950.